(No Model.)
U. D. MIHILLS.
LABEL CABINET.
No. 362,647. Patented May 10, 1887.
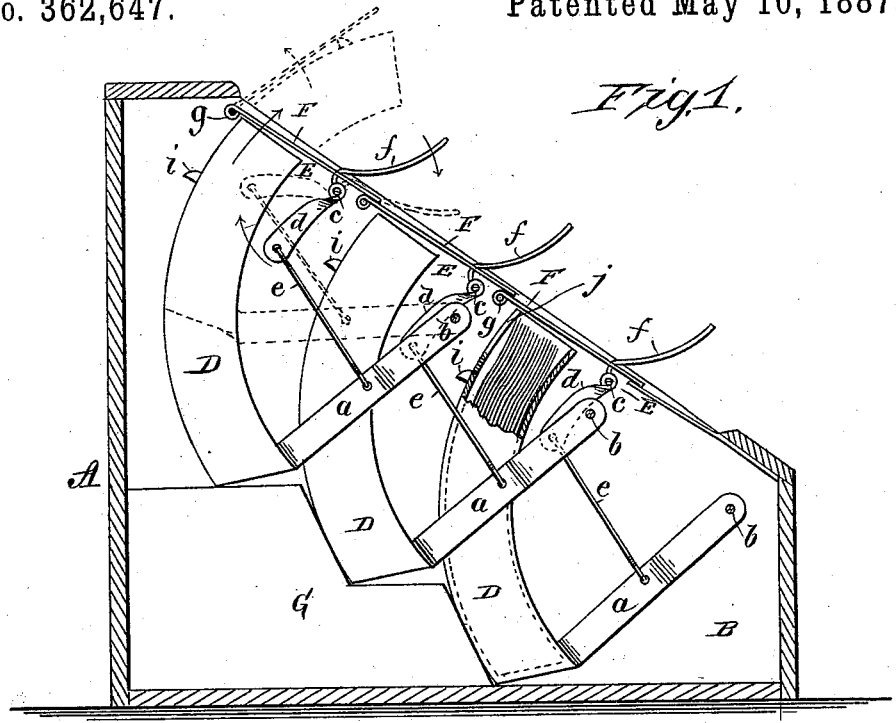
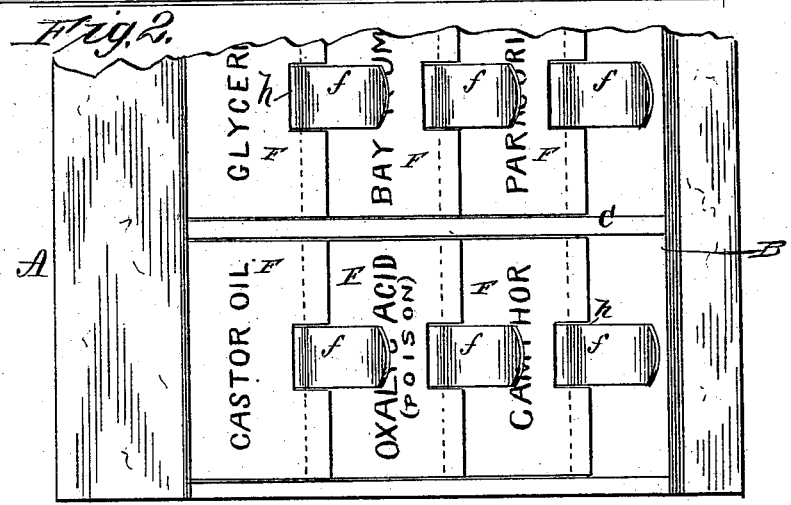
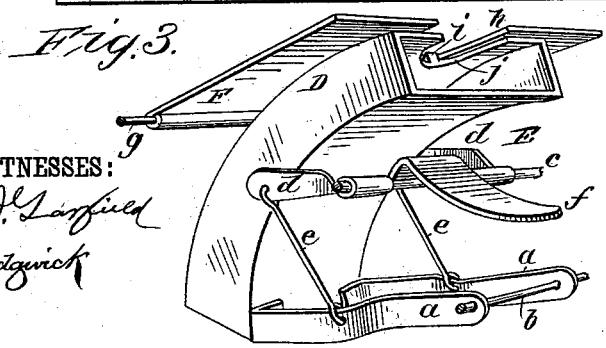
WITNESSES:
J. D. Larfield
C. Sedgwick
INVENTOR:
U. D. Mihills
BY Munn & Co.
ATTORNEYS.

UNITED STATES PATENT OFFICE.

URIAH D. MIHILLS, OF FOND DU LAC, WISCONSIN.

LABEL-CABINET.

SPECIFICATION forming part of Letters Patent No. 362,647, dated May 10, 1887.

Application filed October 12, 1886. Serial No. 216,026. (No model.)

*To all whom it may concern:*

Be it known that I, URIAH D. MIHILLS, of Fond du Lac, in the county of Fond du Lac and State of Wisconsin, have invented a new and Improved Label-Cabinet, of which the following is a specification, reference being had to the annexed drawings, forming a part thereof, in which—

Figure 1 is a side sectional elevation of my improved label-cabinet. Fig. 2 is a plan view, and Fig. 3 is a perspective view of one of the label-holders and the tilting mechanism connected therewith.

Similar letters of reference indicate corresponding parts in all the views.

The object of my invention is to provide a simple and convenient cabinet for the use of druggists and others, for holding labels with the gummed side up and bent backward in opposition to their tendency to curl.

My invention consists in a curved label-receptacle carried by arms pivoted in a suitable cabinet, and in combination therewith of a lever for tilting the receptacle and projecting it from the cabinet; also, of a device for covering the receptacle and for holding it in a projected position.

The cabinet A, which contains the label-receptacles, is divided into compartments B by partitions C, and the top of the cabinet is inclined at an angle of about thirty-five degrees. In each compartment B of the cabinet are placed series of curved label-receptacles D, each of which is provided with two arms, a, pivoted on a wire, b, extending across the compartments B and into the walls thereof. The pivotal wire b is concentric with the curvature of the label-receptacle D.

On the wire c, near the free end of the receptacle D, is placed a three-armed lever, E. The two arms d of the lever E project toward the label-receptacle D and receive wires e, having upon one end loops which enter holes in the arms a near the center of said arms, and upon the opposite ends loops which are received in holes in the arms d of the lever E. The arm f of each lever E projects above the top of the cabinet and is formed on a reverse curve, to render it convenient for handling and to prevent it from touching the covers of the cabinet when it is pressed down to project the label-receptacle D.

Upon a wire, g, extending across the compartment B, is pivoted a cover, F, which extends down over the label-receptacle D, and is provided at its free end with a notch, h, to allow it to close down past the arm f of the lever E. Each label-receptacle D is provided with a beveled nib, i, which engages the edge of the cover F when the receptacle is projected above the top of the cabinet, and thus holds the label-receptacle in a projected position until the cover F is raised to release it. The receptacle D is preferably made rectangular in cross-section, but is curved in longitudinal direction to hold the labels with their gummed side up and in opposition to their tendency to curl, and to permit of projecting it through a small aperture in the top of the cabinet; and in the upper side of the receptacle D, at its open end, is formed a notch, j, to allow the finger to partly enter the receptacle when it is desired to remove the label. The finger is so applied in removing the label as to bend the whole package back still farther, and thus cause all of the labels to slide longitudinally more or less and break up any adhesion and prevent them from sticking together.

My improved cabinet is designed for use principally in connection with gummed labels which tend to curl. The labels are placed in the receptacles with their gummed sides toward the convex sides of the receptacle, thus holding them in opposition to their tendency to curl. I provide a cabinet with several compartments B, and in each compartment I place a series of the label-receptacles D, and in the bottom of the cabinet I arrange a stop, G, for limiting the downward motion of the receptacles.

Although I have shown and described an auxiliary lever for projecting the receptacles from the cabinet, I may in some cases dispense with the lever and project the receptacle either by means of the arms a or by grasping the receptacle directly after raising the cover F.

For convenience in finding labels I apply to each cover F a label of the same character as that contained by the receptacle D below the cover.

To prevent the accumulation of dust in the receptacle, I perforate the bottom thereof to allow the dust to escape.

Having thus fully described my invention, I claim as new, and desire to secure by Letters Patent—

1. In a label-cabinet, the curved label-receptacle D and pivoted arms *a*, in combination, substantially as described.

2. In a label-cabinet, a label-receptacle adapted to hold the labels in a curved position in opposition to their tendency to curl, substantially as specified.

3. In a label-cabinet, the combination, with the curved receptacle D and pivoted arms *a*, attached thereto, of the three-armed lever E and the connecting-wires *e*, substantially as shown and described.

4. In a label-cabinet, the combination of the curved label-receptacle D, provided with the notch *j* and nib *i*, the arms *a*, attached to the receptacle, the three-armed lever E, connecting-wires *e*, and the covers F, substantially as shown and described.

5. The combination, with the cabinet A, having an inclined top and provided with compartments B, of series of curved label-receptacles D, provided with arms *a*, series of levers E, provided with curved outwardly-projecting arms *f*, connecting-wires *e*, and the notched and hinged covers F, arranged over the curved receptacles, substantially as shown and described.

6. The combination, with the cabinet A, having an inclined top and provided with compartments B, of series of curved label-receptacles D, provided with arms *a*, series of levers E, provided with curved outwardly-projecting arms *f*, connecting-wires *e*, the notched and hinged covers F, arranged over the curved receptacles, and the stop G, for limiting the motion of the receptacles, substantially as shown and described.

URIAH D. MIHILLS.

Witnesses:
W. H. DILTS,
ED. L. MALONEY.